May 5, 1925. 1,536,641
B. VON LOUTZKOY
PISTON SUSPENSION IN PNEUMATIC HUBS WITH GUIDE OPERATION
Filed June 20, 1923 2 Sheets-Sheet 1
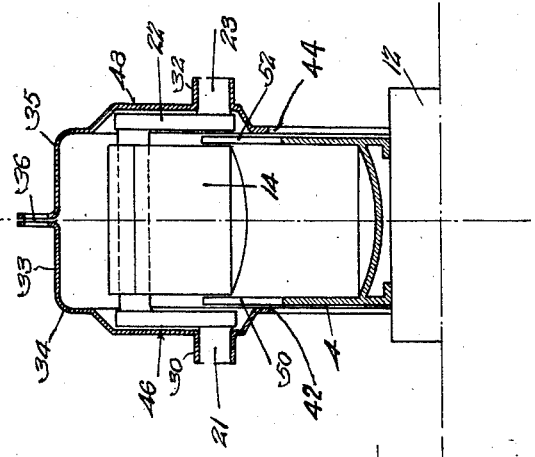
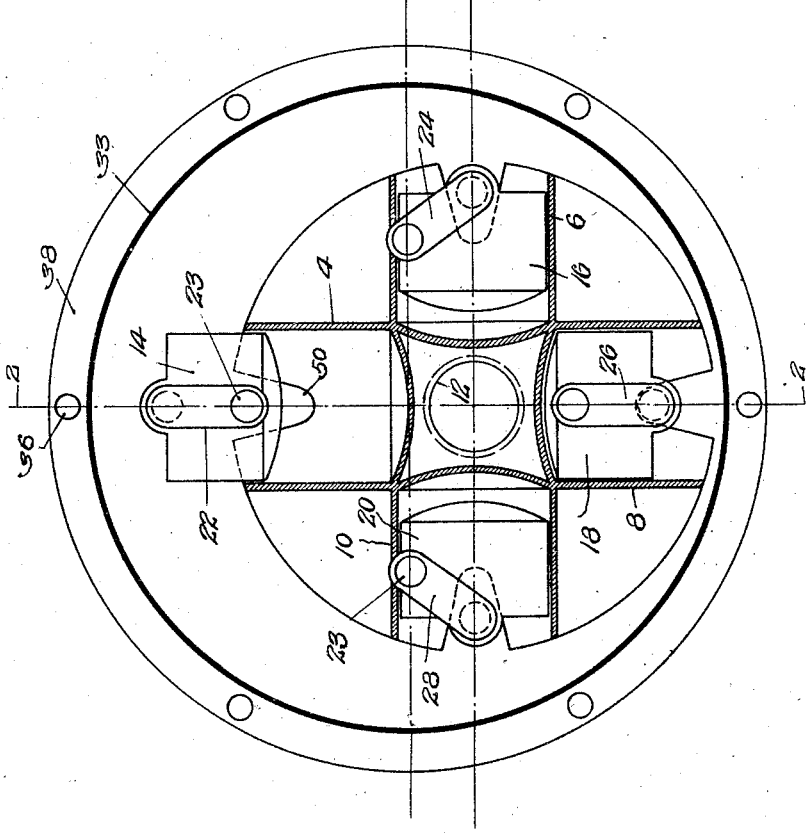
Inventor:

May 5, 1925.                                                               1,536,641
B. VON LOUTZKOY
PISTON SUSPENSION IN PNEUMATIC HUBS WITH GUIDE OPERATION
Filed June 20, 1923          2 Sheets-Sheet 2

Inventor:

Patented May 5, 1925.

1,536,641

UNITED STATES PATENT OFFICE.

BORIS VON LOUTZKOY, OF BERLIN, GERMANY.

PISTON SUSPENSION IN PNEUMATIC HUBS WITH GUIDE OPERATION.

Application filed June 20, 1923. Serial No. 646,711.

*To all whom it may concern:*

Be it known that I, BORIS VON LOUTZKOY, a subject of Russia, and a resident of Berlin W., Viktoria Luiseplatz 1, Germany, have invented a new and useful Improvement in a Piston Suspension in Pneumatic Hubs with Guide Operation, of which the following is a full, clear, and exact specification, reference being had therein to the accompanying drawing.

The present invention relates to pneumatic hubs for vehicle wheels, and more particularly to a novel construction and mode of piston suspension in pneumatic hubs.

The operation of the type of wheel construction for vehicles commonly known as pneumatic hubs is dependent upon the proper mounting of the pistons in the cylinders and has certain limitations in the usual mode of mounting or assembly of parts. In the usual form of construction the pistons are mounted in the cylinders by the use of a common crank ring to which the pistons are connected, the crank ring having arms extending into the interior of the pistons, which are connected thereto by linkages. This arrangement has the disadvantage that the relative movement of the parts is restricted on account of the fact that the arms extend into the interior of the pistons.

One of the objects of the present invention is to provide a means which will overcome the disadvantages of the common crank ring arrangement, so that the relative movements of the parts shall be substantially independent.

Another object of the invention is to provide a pneumatic hub which may be readily assembled and taken down, and which shall be easy to manufacture.

A further object of the invention is to provide a pneumatic hub in which the use of the ordinary form of valve having movable parts is avoided.

With these and other objects in view the invention comprises the novel features hereinafter described and more particularly defined in the claims.

The various features of the invention are illustrated in the accompanying drawings in which—

Fig. 1 is a vertical section through a hub embodying the invention, showing the axle and cylinders in the lowest eccentric position.

Fig. 2 is a section through one of the cylinders of the hub taken on the section line 2—2 of Fig. 1;

Figure 4:
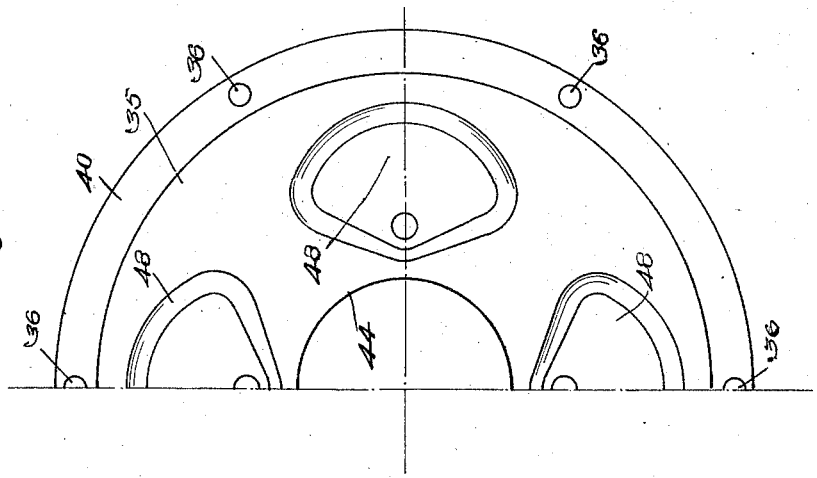
Fig. 4 is a view of a section of one of the cover plates or sides of the casing showing the raised portions around the crank bearings to permit oscillation of the cranks.
Figure 3:
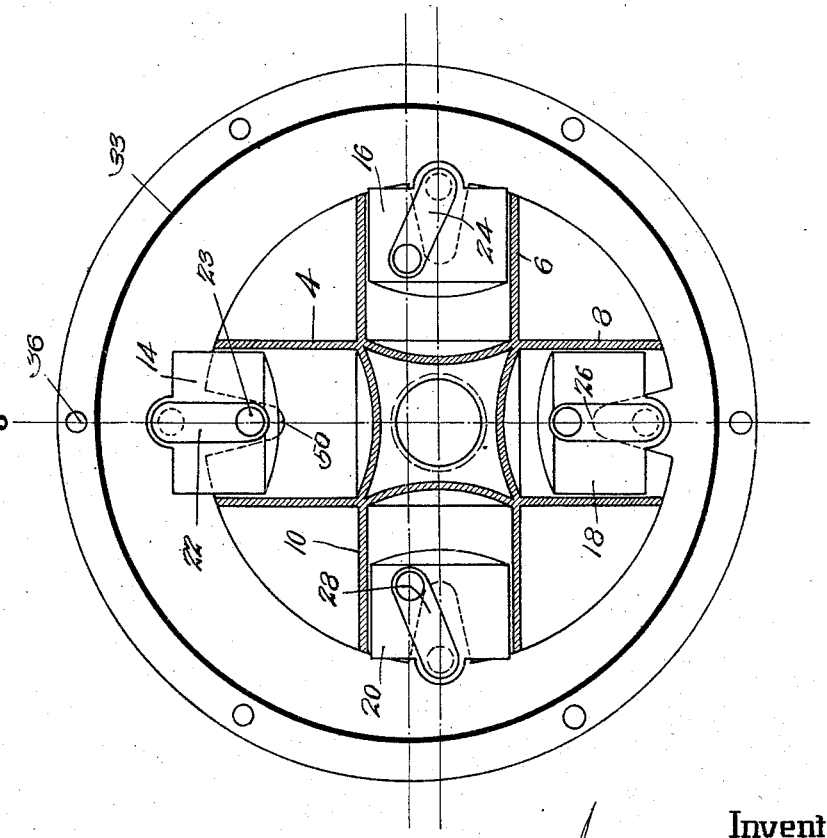
Fig. 3 is a vertical section through the hub showing the relative positions of the pistons and cylinders in intermediate eccentric position.

The preferred embodiment of the invention comprises a plurality of cylinders 4, 6, 8 and 10, which are attached to an axle 12, so as to be movable therewith. Within the cylinders are a series of pistons 14, 16, 18 and 20, which are mounted so as to be slidable therein. Connected to the pistons are double cranks or levers 22, 24, 26 and 28, having journals or trunnions 21, 23, the cranks being so mounted as to suspend the pistons in bearings 30, 32, in a drum or casing 34, surrounding the cylinders. The casing 34 is preferably made of two parts, comprising covers 33, 35, which are screwed together by means of a series of screws passing through openings 36 in the flanges 38 and 40 of the casing. In the covers of the casing are central openings 42, 44, through which the axle 12 passes, and which is of sufficient diameter so that the casing will not come into contact with the axle in any position thereof. In the covers or sides of the casing 33, 35 are raised portions 46, 48 around the bearings 30, 32, as shown in Fig. 2, which permit of oscillatory or swinging movement of the links or cranks about the bearings as an axis. The raised portions are preferably in the form of sectors, as may be seen by reference to Fig. 4 of the drawings. In order to provide for admission of air to the cylinders to attain cushioning action during the movements of the piston therein, a series of ports 50, 52 are provided preferably in the form of V-shaped openings, extending from the base portions of the cylinder toward the head portion thereof. These V-shaped openings extend toward the head end of the cylinder to such a point as to be normally uncovered by the pistons in their stroke away from the head end of the corresponding cylinder during normal operation of the hub in eccentric position. As the ports become uncovered by the pistons, the air passes through the ports into the cylinders which, upon the return of the piston, is compressed and provides cushioning action for the hub. When the hub is at a standstill, there is a greater exposure of port opening, or, in other words, a larger portion of the port is exposed by the piston. During the rotation of the hub, however, the amount of air admitted through the ports remain substantially constant.

One of the main advantages of the form of hub embodying the present invention is the simplicity in construction, which permits the hub to be taken apart by merely removing the screws from the flanges of the cover plates. By taking off one cover plate, the various cylinders and pistons, together with the cranks, are exposed, whereby the parts may be cleaned or replaced, if desired. The various parts of the device are readily replaced by inserting the crank journals into the bearings in one face or coverplate and then replacing the other coverplate or casing by inserting the corresponding journals in their bearings and connecting the casing flanges by means of screws in the openings, 36. It is apparent that assembly or disassembly of the device may be rapidly and easily accomplished, and that there are no parts such as valves and similar mechanisms to get out of order.

It is to be understood that the device which has been described constitutes the preferred embodiment of the invention, but that various changes or modifications may be made in the device without departing from the spirit or scope of the invention as defined in the claims.

Having thus described the invention, what is claimed as new is:

1. In a pneumatic hub having piston cylinder units, means for suspending the pistons comprising double cranks connected to the pistons, a casing for said units and bearings in the casings for said cranks.

2. In a pneumatic hub, having piston cylinder units in which the cylinders are connected to the axle thereof, means for suspending the pistons independently of said axle, said means comprising double cranks having journals at the ends thereof, means for connecting said cranks to the pistons, a demountable casing and bearings in said casing for said journals.

3. In a pneumatic hub, an axle, cylinders attached to said axle, pistons in the cylinders mounted independently thereof, ports extending longitudinally in the walls of said cylinders for admission of air thereto, said ports being so positioned in said walls as to be uncovered by the pistons during rotation of said hub.

4. In a pneumatic hub, an axle having cylinders attached thereto, pistons in the cylinders, an outer casing substantially surrounding said cylinders, ports in the walls of said cylinders extending from the outer ends thereof toward the inner or head ends of the cylinders, said ports being so positioned with respect to the piston stroke as to be uncovered by the pistons during normal rotation of said hub.

5. In a pneumatic hub, an axle having cylinders attached thereto, pistons in the cylinders, double cranks attached to said pistons, said cranks having journals at each end, a two-part casing enclosing said cylinders, bearings in each of said parts for said journals, raised portions adjacent said bearings to permit swinging movement of said cranks, and ports in the cylinders for admission of air to the cylinders.

6. In a pneumatic hub, an axle having cylinders attached thereto, pistons in the cylinders, a two-part casing surrounding said cylinders, a double crank connected to each of said pistons, bearings in each part of said casing for said cranks and V-shaped ports in the cylinders extending toward the head ends thereof, the said ports being of such length as to be uncovered by the pistons during the stroke from the head end of the cylinder.

In testimony whereof I have signed my name to this specification.

BORIS von LOUTZKOY.